United States Patent
He et al.

(10) Patent No.: US 10,350,966 B2
(45) Date of Patent: Jul. 16, 2019

(54) DYNAMICALLY CONTROLLED VEHICLE COOLING AND HEATING SYSTEM OPERABLE IN MULTI-COMPRESSION CYCLES

(71) Applicant: FORD GLOBAL TECHNOLOGIES, LLC, Dearborn, MI (US)

(72) Inventors: Jing He, Novi, MI (US); Debasish Dhar, Canton, MI (US); William Stewart Johnston, Oakland, MI (US); Loren John Lohmeyer, III, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 14/823,667

(22) Filed: Aug. 11, 2015

(65) Prior Publication Data

US 2017/0043645 A1 Feb. 16, 2017

(51) Int. Cl.
*B60H 1/00* (2006.01)
*B60H 1/32* (2006.01)

(52) U.S. Cl.
CPC .......... *B60H 1/3213* (2013.01); *B60H 1/3223* (2013.01); *B60H 2001/00928* (2013.01);
(Continued)

(58) Field of Classification Search
CPC .. B60H 1/3214; B60H 1/3211; B60H 1/3213; B60H 1/3208; B60H 1/3223; B60H 1/004
(Continued)

(56) References Cited

U.S. PATENT DOCUMENTS

| 6,073,454 A | 6/2000 | Spauschus et al. |
| 6,694,763 B2 | 2/2004 | Howard |

(Continued)

FOREIGN PATENT DOCUMENTS

| CN | 101568770 A | 10/2009 |
| JP | 2006144635 A | 6/2006 |

OTHER PUBLICATIONS

Fleming, J.S. (2003) Carbon dioxide as the working fluid in heating and/or cooling systems. The Bulletin of the International Institute of Refrigeration, 83 (4). pp. 7-15. ISSN 2033-0056 http://eprints.cdlr.strath.ac.uk/5972/.

(Continued)

*Primary Examiner* — Davis D Hwu
(74) *Attorney, Agent, or Firm* — Vichit Chea; King & Schickli, PLLC (57) ABSTRACT

A vehicle heating and cooling system includes a compressor(s) for compressing a fluid in a cycle including at least two compressions, and a control module for controlling the compressor dependent upon an ambient condition. The module controls a power of the compressor by adjusting a motor speed driving the compressor and/or a pressure drop of the fluid moving through expansion devices. The pressure drop is controlled by changing a size of an opening in the expansion devices. A related method includes compressing a fluid in a first and a second compression cycle, determining an ambient temperature, sensing a temperature of the fluid outlet from a first heat exchanger, sensing a temperature and a pressure of the fluid outlet from a second heat exchanger, calculating a desired power of the compressor based thereon, and adjusting a parameter of the compressor dependent upon the calculated desired power of the compressor.

19 Claims, 7 Drawing Sheets
(1 of 7 Drawing Sheet(s) Filed in Color)

(52) U.S. Cl.
CPC .............. *B60H 2001/3238* (2013.01); *B60H 2001/3267* (2013.01)

(58) Field of Classification Search
USPC ........................................................ 165/202
See application file for complete search history.

(56) References Cited

U.S. PATENT DOCUMENTS

| | | | |
|---|---|---|---|
| 7,845,190 | B2 | 12/2010 | Pearson |
| 8,156,754 | B2 | 4/2012 | Hong et al. |
| 8,347,642 | B2 * | 1/2013 | Akahoshi ............... B60H 1/004 62/133 |
| 8,776,536 | B2 | 7/2014 | Benouali |
| 2002/0023451 | A1 | 2/2002 | Kuroda et al. |
| 2002/0092310 | A1 | 7/2002 | Murase et al. |
| 2004/0093880 | A1 * | 5/2004 | Zheng .................. B60H 1/3214 62/199 |
| 2004/0136854 | A1 | 7/2004 | Kimura et al. |
| 2006/0048531 | A1 * | 3/2006 | Eisenhour ............ B60H 1/3208 62/228.3 |
| 2009/0242652 | A1 * | 10/2009 | Hong ................... B60H 1/3211 236/46 R |
| 2010/0071391 | A1 | 3/2010 | Lifson |
| 2011/0256001 | A1 * | 10/2011 | Kobayashi ............ F04B 25/005 417/339 |
| 2011/0256007 | A1 * | 10/2011 | Shaffer ............... F04C 18/0223 418/5 |
| 2014/0157811 | A1 | 6/2014 | Shimazu et al. |
| 2014/0348681 | A1 | 11/2014 | Obrist et al. |

OTHER PUBLICATIONS

Governor Brown Establishes Most Ambitious Greenhouse Gas Reduction Target in North America New California Goal Aims to Reduce Emissions 40 Percent Below 1990 Levels by 2030 Apr. 29, 2015 http://gov.ca.gov/news.php?id=18938.

Mar. 23, 2015 Volkswagen to use CO2 in air conditioning systems http://www.environmentalleader.com/2015/03/23/vw-using-co2-in-air-conditioning-systems/.

Mar. 19, 2015 VW to implement CO2 MAC in two luxury models http://www.r744.com/articles/6225/vw_to_implement_co_sub_2_sub_mac_in_two_luxury_models.

Refrigerants: Looking forward to a clean and safe solution. Daimler considers CO2 as the only solution for clean, safe MAC http://www.daimlercom/dccom/0-5-876574-1-1691213-1-0-0-0-0-0-0-0-0-0-0-0-0-0.html Mar. 23, 2015 © 2015 Daimler AG.

United States, Canada, and Mexico Submit North American HFC Phase Down Amendment to the Montreal Protocol Media Note; Office of the Spokesperson,Washington, DC; Apr. 15, 2015 http://www.state.gov/r/pa/prs/ps/2015/04/240730.htm.

Fluorinated greenhouse gases F-gas emissions to be cut by two-thirds by 2030 in the EU Apr. 30, 2015 http://ec.europa.eu/clima/policies/f-gas/.

English machine translation of JP2006144635.
English machine translation of CN101568770.

* cited by examiner

DYNAMICALLY CONTROLLED VEHICLE COOLING AND HEATING SYSTEM OPERABLE IN MULTI-COMPRESSION CYCLES

TECHNICAL FIELD

This document relates generally to vehicle heating/cooling systems, and more specifically to a dynamically controlled vehicle heating/cooling system operating in multi-compression cycles.

BACKGROUND

Progressive global warming legislation in the European Union (EU) and the United States (US) is constantly driving automotive Original Equipment Manufacturers (OEMs) to seek an environmentally friendly refrigerant for use in mobile climate control applications. The traditionally used refrigerant, R134a, is a fluorinated greenhouse gas (F-gas) with a high Global Warming Potential (GWP) of 1,430. The EU Directive 2006/40/EC requires mandatory phase-out of R134a by Jan. 1, 2017, for passenger and light commercial vehicles. In the US, the Environmental Protection Agency (EPA) and the National Highway Traffic Safety Administration (NHTSA) have developed the One National Program to reduce greenhouse gas emissions and improve fuel economy. Most recently, EPA has listed R134a as unacceptable for newly manufactured light-duty vehicles beginning in Model Year 2021 with limited exceptions.

The synthetic refrigerant, R1234yf, is introduced as a near drop-in alternate to R134a with a relatively low GWP of 4 and similar thermodynamic properties. A limited supply of R1234yf and a high price, however, have created concern and some OEMs consider R1234yf to be an interim replacement while continuing to study other solutions, R744 (carbon dioxide) offers another option due to its low cost, nonflammability, high volumetric heat capacity, and perhaps most importantly, environmental friendliness, i.e., R744 is a natural substance having an ODP=0 and a GWP=1.

System performance in terms of energy efficiency and effectiveness in cooling and heating is another driver for new climate control technology. Operation of mobile air conditioning (MAC) units could consume 10% or more fuel for gasoline and diesel engines. For hybrid and electric vehicles, the heat pump technology is gaining popularity due to significantly improved heating efficiency compared to electric heating methods. The R134a or R1234yf heat pump systems, however, suffer from poor performance and sub-atmospheric pressure operation for low ambient conditions below −20 degrees Celsius. While the R744 system circumvents this drawback, its cooling efficiency decreases as the ambient temperature rises. The existing R744 systems are generally considered useful below approximately 40 degrees Celsius. Accordingly, a need exists for a system utilizing an environmentally friendly refrigerant that overcomes the noted limitations and operates efficiently in both warm and cold regions.

Preferably, the system would utilize a refrigerant having low GWP values, such as the natural refrigerant R744, and maintain its efficiency regardless of ambient temperature. In other words, the system should operate efficiently for low ambient conditions below −20 degrees Celsius, high above 40 degrees Celsius, and all conditions in between. The system should also be able to be implemented in all types of vehicles including hybrid and electric vehicles, in hybrid and electric vehicles, the system should increase, if not significantly increase, driving ranges. Similarly, fuel economy for gasoline and diesel vehicles should improve.

SUMMARY OF THE INVENTION

In accordance with the purposes and benefits described herein, a vehicle heating and cooling system is provided. The heating and cooling system may be broadly described as comprising at least one compressor for compressing a fluid in a cycle including at least two compressions, and a control module for controlling the at least one compressor dependent upon an ambient condition of the vehicle.

In one possible embodiment, the control module controls a power of the at least one compressor. In another possible embodiment, the at least one compressor is an electric compressor driven by a motor, and the control module controls the power of the electric compressor by adjusting a speed of the motor. In still another, the at least one compressor is a belt-driven variable displacement compressor, and the control module controls the power of the belt-driven variable displacement compressor by varying a displacement of the belt-driven variable displacement compressor.

In another possible embodiment, the at least one compressor includes first and second scrolls. In still another possible embodiment, the first and second scrolls operate in parallel. In another, the first and second scrolls operate in stages. In yet another possible embodiment, the at least one compressor includes a single type shaft shared by the first and second scrolls.

In one other possible embodiment, the vehicle heating and cooling system further includes first and second expansion devices, and the control module further controls the first and second expansion devices dependent upon at least the ambient condition of the vehicle.

In another possible embodiment, the vehicle heating and cooling system further includes a first temperature sensor for sensing a temperature of the fluid outlet from a first heat exchanger, and a second temperature sensor and a first pressure transducer for sensing a temperature and a pressure of the fluid outlet from a second heat exchanger, wherein the control module controls the at least one compressor and the first and second expansion devices dependent upon the ambient condition of the vehicle, the first sensed temperature, the second sensed temperature, and the first sensed pressure.

In still another possible embodiment, the first and second expansion devices are electronic expansion devices, and the control module controls a first pressure drop of the fluid moving through the first expansion device and a second pressure drop of fluid moving through the second expansion device.

In yet another possible embodiment, the ambient condition includes at least one of an ambient temperature of the vehicle, an ambient humidity of the vehicle, and an ambient solar load of the vehicle.

In another possible embodiment, the control module controls a power of the at least one compressor, and the at least one compressor is an electric compressor driven by a motor, and the control module controls the power of the electric compressor by adjusting a speed of the motor.

In another possible embodiment, a vehicle heating and cooling system includes a compressor for compressing a fluid in a cycle including at least two compressions, a first expansion device through which the fluid moves, a second expansion device through which the fluid moves, and a control module for controlling the compressor and at least one of the first and the second expansion devices dependent upon an ambient condition of the vehicle.

In another possible embodiment, the control module controls the compressor and at least one of the first and the second expansion devices dependent upon at least one of a first temperature of the fluid between a first heat exchanger and said first expansion device, a second temperature of the fluid between a second heat exchanger and said compressor, and a pressure of the fluid between said second heat exchanger and said compressor.

In accordance with the purposes and benefits described herein, a method is provided of heating and cooling a passenger compartment in a vehicle. The method may be broadly described as comprising the steps of: (a) compressing a fluid in a first and a second compression cycle of a compressor; (b) determining an ambient temperature of the vehicle; (c) sensing a temperature of the fluid outlet from a first heat exchanger; (d) sensing a temperature and a pressure of the fluid outlet from a second heat exchanger; (e) calculating a desired power of the compressor based on the ambient temperature, and the sensed temperature of the fluid from the first heat exchanger, and the sensed temperature and pressure of the fluid from the second heat exchanger; and (f) adjusting a parameter of the compressor dependent upon the calculated desired power of the compressor.

In one possible embodiment, the step of adjusting a parameter of the compressor includes adjusting a speed of a motor driving the compressor.

In another possible embodiment, the method further includes the steps of calculating a desired pressure drop based on the ambient temperature, and the sensed temperature of the fluid from the first heat exchanger and the sensed temperature and pressure of the fluid from the second heat exchanger, and changing a pressure of the fluid dependent upon the calculated desired pressure drop.

In yet another possible embodiment, the step of changing the pressure of the fluid includes adjusting a size of an orifice of at least one expansion device through which the fluid moves.

In still another possible embodiment, the first heat exchanger cools the compressed fluid and the second heat exchanger functions as an evaporator in a cooling mode, and the first heat exchanger functions as an evaporator and the second heat exchanger cools the compressed fluid in a heating mode.

In the following description, there are shown and described several embodiments of a vehicle heating and cooling system and related methods of heating and cooling a passenger compartment in the vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

The accompanying drawing figures incorporated herein and forming a part of the specification, illustrate several aspects of the vehicle heating and cooling system and related methods and together with the description serve to explain certain principles thereof. In the drawing figures.

Reference will now be made in detail to the present preferred embodiments of the vehicle heating and cooling system and related methods of heating and cooling a passenger compartment, examples of which are illustrated in the accompanying drawing figures, wherein like numerals are used to represent like elements.

DETAILED DESCRIPTION

Figure 1:
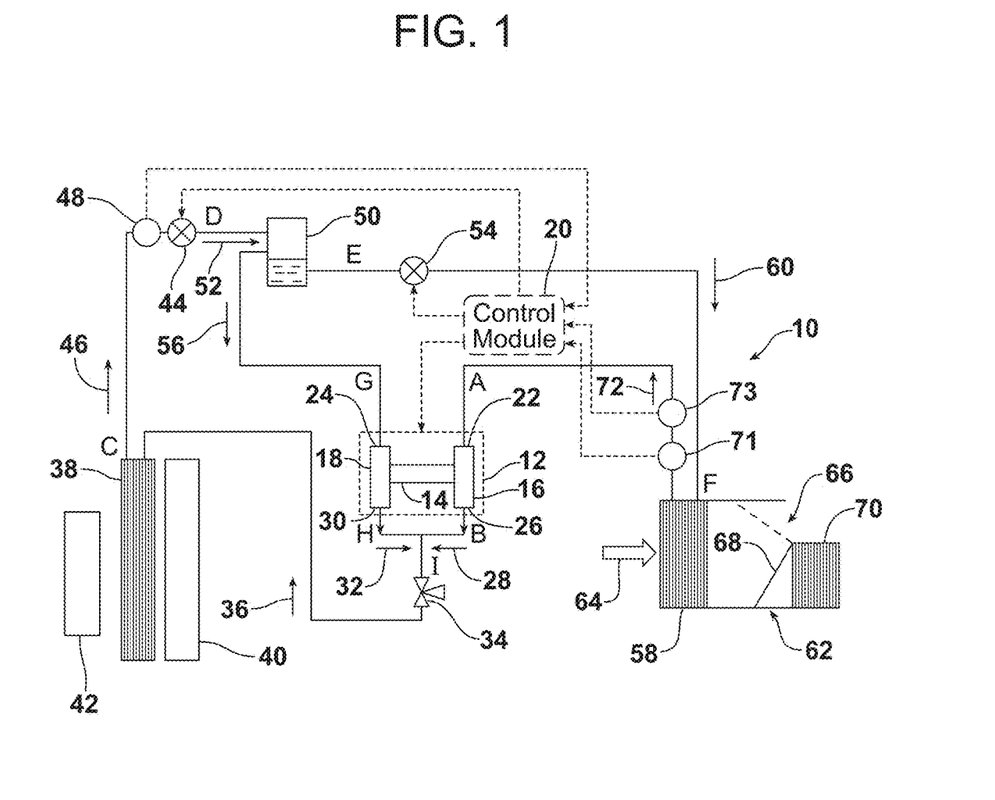
FIG. 1 is a schematic diagram of a vehicle heating and cooling system having a compressor with dual scrolls operating in parallel in a cooling mode.
Figure 2A:
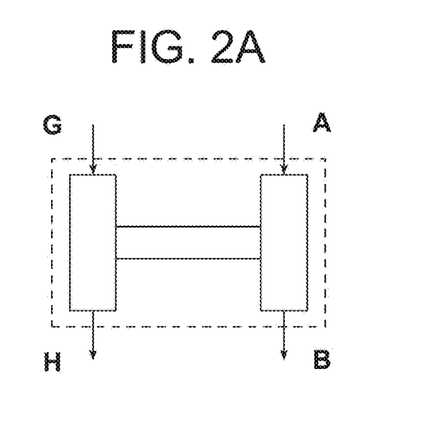
FIGS. 2A-2D depict varying alternate embodiment compressors.
Figure 2B:
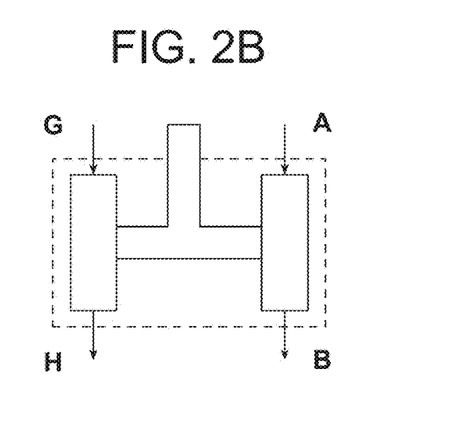
Figure 2C:
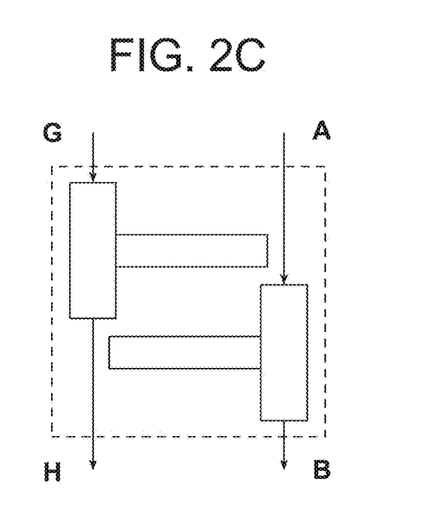
Figure 2D:
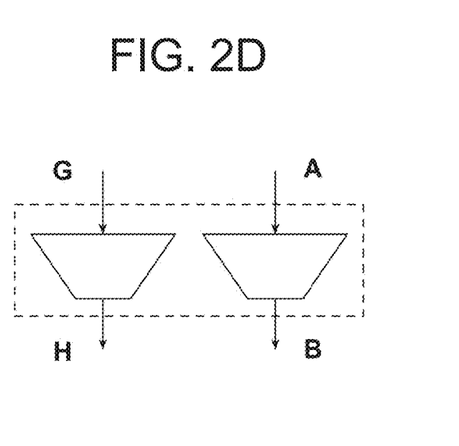

Reference is now made to FIG. 1 which illustrates a schematic diagram of a vehicle heating and cooling system 10 including a compressor 12. In the described embodiment, the heating and cooling system 10 is an R744 air conditioning and heat pump system using parallel or multi-stage compressions with a dynamically controlled single-shaft or multi-shaft scroll compressor 12. The described system provides a high efficiency, environmentally friendly solution for automotive climate control in both warm and cold regions. While the technology can be implemented in all types of vehicles and with different refrigerants, the system is considered most suitable for hybrid and electric vehicles using electric compressors driven by variable speed motors. Alternate embodiments may utilize variable displacement or traditional compressors driven by a compressor belt which in turn is driven by a crankshaft of the vehicle.

The compressor, in the described embodiments, includes dual scrolls and unified drive elements. As shown in FIG. 1, the compressor 12 includes a single type shaft 14 shared by first and second scrolls 16, 18 driven by a variable speed motor (not shown). A control module 20 is electrically connected to the compressor 12 (as shown by dashed line) and adjusts a speed of the motor dependent upon certain ambient conditions, including, for example, an ambient air temperature ($T_A$) of the vehicle, described in more detail below.

As shown generally in FIG. 2, a type and configuration of the compressor may vary in alternate embodiments. FIG. 2A, for example, represents a compressor having a single type shaft shared by all scrolls. FIG. 2B represents a compressor having a multi type shaft, namely, a "T" shaped configuration. Similarly, FIG. 2C represents a compressor having a parallel, multi-type shaft, configuration. Also, FIG. 2D represents two variable displacement compressors or two scroll compressors each having a single scroll operating in parallel. Generally speaking, the compressor may include one or more compressors which function to compress the refrigerant in a cycle including at least two compressions regardless of compressor configuration.

Returning to the described embodiment shown in FIG. 1, the first scroll 16 and the second scroll 18 of the compressor 12 operate in parallel. In this arrangement, a fluid (e.g., an R744 refrigerant) in the form of a gas or vapor refrigerant enters first and second suction ports 22, 24 and is compressed by the first and second scrolls 16, 18. This cycle includes two compressions which occur at substantially the same time, i.e., in parallel, and compress the fluid into a high-pressure, high-temperature vapor refrigerant. The high-pressure, high-temperature vapor refrigerant compressed by the first scroll 16 in the first compression exits the compressor 12 via a first discharge port 26 as shown by action arrow 28. Similarly, a high-pressure, high-temperature vapor refrigerant compressed by the second scroll 18 in the second compression exits the compressor 12 via a second discharge port 30 as shown by action arrow 32.

The first and second high-pressure, high-temperature vapor refrigerants are merged and fed to a three-way valve 34. Another control module (not shown) is electrically connected to the three-way valve 34 and signals the three-way valve in the described embodiment to direct the high-pressure, high-temperature vapor refrigerant dependent upon a mode of operation of the system 10. In the described embodiment, the control module is a power train control module connected to a vehicle computer via a CAN bus. The module is responsive to a switch (or other input means) operated by an occupant in the vehicle. The switch (e.g., an AC on/off switch) changes a mode of operation from a heating mode to a cooling mode or vice-versa. Of course, in alternate embodiments, any control module in the vehicle could be utilized to control the three-way valve dependent upon the mode of operation.

In alternate embodiments, the three-way valve may be replaced by a series of valves sufficient to direct the merged high-pressure, high-temperature vapor refrigerant in desired directions dependent upon the mode. Again, the valves may receive signals from the power train control module or another control module within the vehicle. The varying directions are described in more detail for the heating and cooling modes below. In the described cooling mode, the three-way valve 34 directs the high-pressure, high-temperature vapor refrigerant as shown by action arrow 36 in FIG. 1 to a first heat exchanger 38.

The first heat exchanger 38, in the cooling mode, is an outdoor heat exchanger (or condenser) positioned in front of an engine radiator 40 as is known in the art. Within the first heat exchanger 38, the high-pressure, high-temperature vapor refrigerant discharged from the compressor 12 is cooled due primarily to the effect of outside air. A fan 42 may be utilized to create and regulate a flow of air over the first heat exchanger 38 and the radiator 40.

The cooled, high-pressure refrigerant is then sent to a first expansion device 44 as shown by action arrow 46. A thermocouple 48 senses a temperature ($T_1$) of the refrigerant outlet from the first heat exchanger 38 prior to entering the first expansion device 44. Although the thermocouple 48 is depicted in FIG. 1 adjacent the first expansion device 44, the thermocouple, or a different type of temperature sensor in an alternate embodiment, could be positioned near an outlet of the first heat exchanger 38, or anywhere between the two devices. The thermocouple 48 is electrically connected (as shown by dashed line) to the control module 20 which receives the sensed temperature ($T_1$) of the refrigerant for use in calculating a desired power of the compressor 12.

The desired power is calculated using the sensed temperature ($T_1$), a second sensed temperature ($T_2$), a sensed pressure ($P_1$), and at least one ambient condition (e.g., an ambient temperature ($T_A$)) of the vehicle. A temperature sensor (not shown) senses the ambient temperature ($T_A$) of the vehicle and the result is provided to the control module 20. Similarly, a humidity sensor (not shown) senses an ambient humidity of the vehicle and a solar load sensor (not shown) senses a solar load of the vehicle. The results are likewise provided to the control module 20. The second sensed temperature ($T_2$) and the sensed pressure ($P_1$) are likewise provided to the control module 20 and will be described in more detail below. Depending upon the calculated desired power, a parameter of the compressor 12 is adjusted. For example, a speed of the motor of the compressor 12 may be adjusted to ensure optimal performance.

In the first expansion device 44, the outlet refrigerant from the first heat exchanger 38 is expanded to become an intermediate-pressure, intermediate-temperature liquid and vapor refrigerant mixture which is supplied to a separator 50 as shown by action arrow 52. Regulation of the flow of refrigerant through the expansion device 44, or throttling, is used to control a temperature of the refrigerant within the separator 50. Increasing the pressure drop necessarily lowers the temperature of the refrigerant within the separator 50.

In the described embodiment, the control module 20 is electrically connected to the expansion device 44 (as shown by dashed line) and operates to control the flow of the refrigerant and a drop in pressure of the refrigerant moving through the expansion device to ensure optimal performance. In the described embodiment, the first expansion device 44 is an electronic expansion device having an opening therein through which the refrigerant passes. The control module 20 controls a size of the opening within the expansion device 44 which determines the drop in pressure of the refrigerant moving through the device. The drop in pressure is changed dependent upon the same input as used to calculated the desired power of the compressor by the control module 20.

A second expansion device 54 (described in more detail below) is also an electronic expansion device in the described embodiment and is electrically connected to the control module 20 (as shown by dashed line). In alternate embodiments, one or both of the first and second expansion devices could be fixed orifice tubes with associated bypass devices which together provide a specific drop in pressure.

An intermediate-pressure, intermediate-temperature gas refrigerant exits the separator 50, as shown by action arrow 56, and is received in the second scroll 18 of the compressor 12 where the gas refrigerant is again compressed and cycled through the system 10. The separated liquid refrigerant within the separator 50 is sent as an intermediate-pressure, intermediate-temperature liquid refrigerant to the second expansion device 54. In the second expansion device 54, the intermediate-pressure, liquid refrigerant is expanded to become a low-pressure, low-temperature liquid and vapor refrigerant mixture which is supplied to a second heat exchanger 58 as shown by action arrow 60. Regulation of the flow of refrigerant through the expansion device 54, or throttling, is used to control a temperature of the refrigerant mixture within the second heat exchanger 58. Increasing the pressure drop necessarily lowers the temperature of the refrigerant within the second heat exchanger 58.

In the described embodiment, the control module 20 is electrically connected to the second expansion device 54 (as shown by dashed line) and operates to control the flow of the refrigerant mixture and the drop in pressure of the refrigerant mixture moving through the expansion device to ensure optimal performance. Also, the second expansion device 54 is an electronic expansion device having an opening therein through which the refrigerant passes. The control module 20 controls a size of the opening within the expansion device 54 which determines the drop in pressure of the refrigerant moving through the device. The drop in pressure is changed dependent upon the same input as used to calculate the desired power of the compressor by the control module 20.

In the described cooling mode, the second heat exchanger 58 functions as an evaporator. As is known in the art, the evaporator 58 is positioned within a heating, ventilation, and air conditioning (HVAC) case 62 of the vehicle and is used to cool a passenger compartment (not shown). Warm, moist air flowing across the evaporator 58 (as shown by arrow 64) transfers its heat to the cooler refrigerant within the evaporator. The byproducts are a lowered temperature air and condensation from the air which is routed from the evaporator 58 to an exterior of the vehicle. A blower (not shown) blows air across the evaporator 58 and through a vent 66 to the passenger compartment. This process results in the passenger compartment having a cooler, drier air therein. A blend door 68 blocks the flow of air from entering a third heat exchanger 70 which is utilized in the heating mode and will be described below.

Within the evaporator 58, the low-pressure, low-temperature liquid and vapor refrigerant mixture boils to a vapor due to the heat removed from the air. The low-pressure, low-temperature vapor refrigerant exits the evaporator 58, as shown by action arrow 72, and is received at the first suction port 22 of the first scroll 16 of the compressor 12. A thermocouple 71 senses a temperature ($T_2$) of the refrigerant outlet from the second heat exchanger 58 prior to entering the compressor 12. Although the thermocouple 71 is depicted in FIG. 1 adjacent the second heat exchanger 58, the thermocouple, or a different type of temperature sensor in an alternate embodiment, could be positioned near an outlet of the second heat exchanger 58, or anywhere between the two devices. The thermocouple 71 is electrically connected (as shown by dashed line) to the control module 20 which receives the sensed temperature ($T_2$) of the refrigerant for use in calculating the desired power of the compressor 12.

Similarly, a transducer 73 senses a pressure ($P_2$) of the refrigerant outlet from the second heat exchanger 58 prior to entering the compressor 12. Although the transducer 73 is depicted in FIG. 1 adjacent the thermocouple 71, the transducer, or a different type of pressure sensor in an alternate embodiment, could be positioned near an outlet of the second heat exchanger 58, or anywhere between the two devices. The transducer 73 is electrically connected (as shown by dashed line) to the control module 20 which receives the sensed pressure ($P_2$) of the refrigerant for use in calculating the desired power of the compressor 12.

In the compressor 12, the refrigerant is again compressed and cycled through the system 10. More specifically, compression of low-pressure, low-temperature vapor occurs within the first scroll 16 and compression of intermediate-pressure, intermediate-temperature vapor from the separator 50 occurs within the second scroll 18 occur at the same time. As indicated above, the compressed refrigerants from the first and second scrolls of the compressor 12 are merged prior to being directed by the three-way valve 34.

Figure 3:
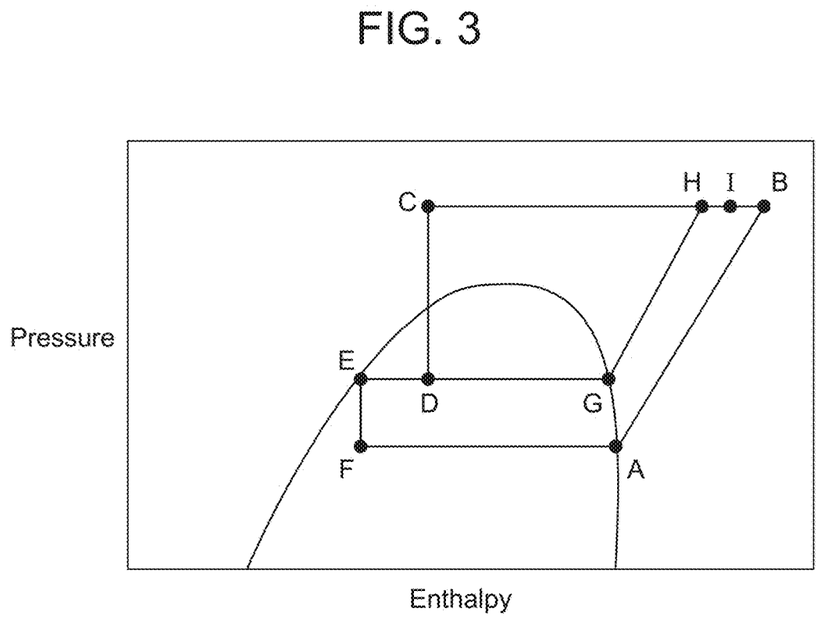
FIG. 3 is a pressure-enthalpy diagram of the vehicle heating and cooling system having a compressor with dual scrolls operating in parallel in the cooling mode.

FIG. 3 is a pressure-enthalpy diagram of the vehicle heating and cooling system 10 with the compressor 12 with dual scrolls operating in parallel in the cooling mode. The reference letters on the diagram correspond to locations within the system 10, as shown in FIG. 1. For example, reference letter I is positioned at a point where the compressed refrigerants from the first and second scrolls of compressor 12 are merged prior to being directed by the three-way valve 34. Even more, A-B refers to the compression within the first scroll, G-H refers to the compression within the second roll, C-D refers to the expansion within the first expansion device, and E-F refers to the expansion within the second expansion device.

Figure 4:
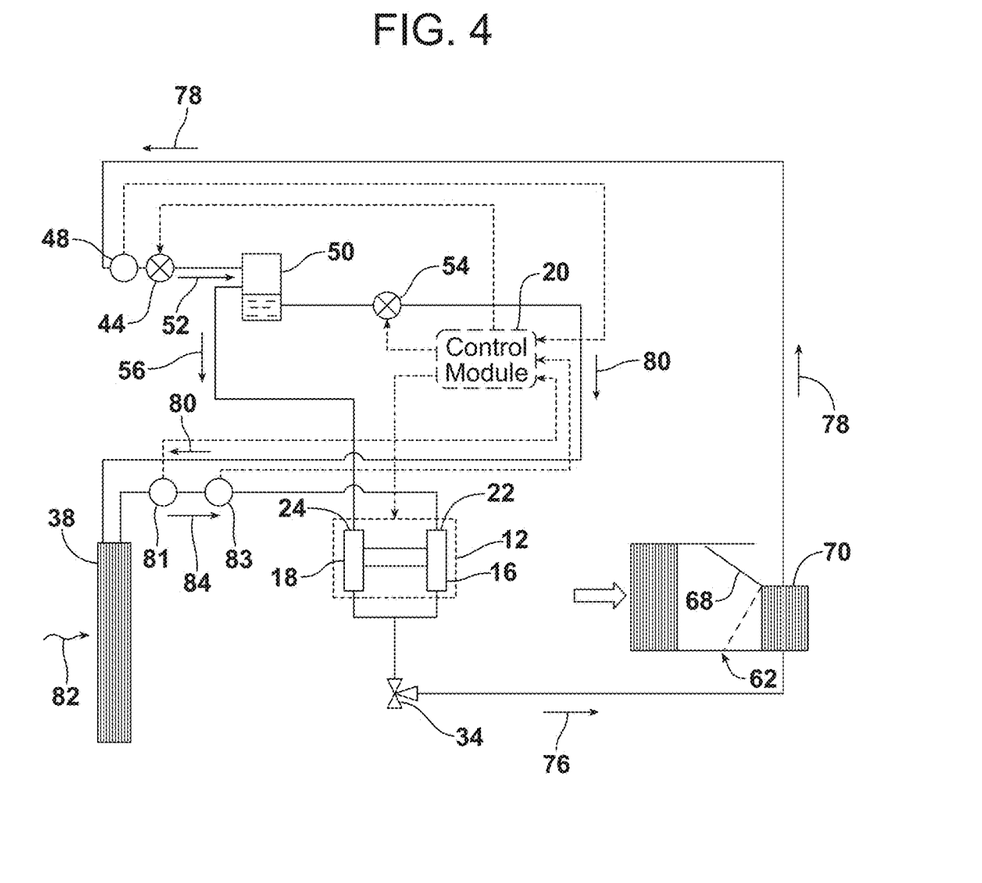
FIG. 4 is a schematic diagram of the vehicle heating and cooling system having a compressor with dual scrolls operating in parallel in a heating mode.

As shown in FIG. 4, the vehicle heating and cooling system 10 is also operable in a heating mode. In the heating mode, the control module 20 directs the flow of the merged first and second high-pressure, high-temperature vapor refrigerants fed to the three-way valve 34 to a third heat exchanger 70 rather than the first heat exchanger 38. As described above, the three-way valve 34 is controlled by a power train control module dependent upon a mode of operation. Thus, in the heating mode, the three-way valve 34 directs the flow in a different direction from the direction of flow in the cooling mode.

Since the merged refrigerant is not directed to the first heat exchanger 38, the flow of refrigerant therethrough, as shown by action arrows 36 and 46 in FIG. 1, ceases. For clarity, the lines within which refrigerant is moving in the heating mode only are not shown in FIG. 1 and the lines within which refrigerant is moving in the cooling mode only are not shown in FIG. 4. The same will be the case for FIGS. 6 and 7 described below.

In the heating mode shown in FIG. 4, the three-way valve 34 directs the merged high-pressure, high-temperature vapor refrigerant to the third heat exchanger 70 as shown by action arrow 76. The third heat exchanger 70 is a supplemental heat exchanger positioned within the HVAC case 62 of the vehicle. The blend door 68 is used in the heating mode to regulate the flow of air created by the blower (not shown) allowing air to travel through, or partially through, the supplemental heat exchanger 70. In this manner, a temperature of the air used to warm the passenger compartment can be adjusted. As cool air passes through the supplemental heat exchanger 70, the high-pressure, high-temperature vapor refrigerant is cooled due primarily to the effect of air.

The cooled, high-pressure refrigerant is then sent to the first expansion device 44 as shown by action arrows 78. The thermocouple 48 senses a temperature ($T_1$) of the refrigerant outlet from the third heat exchanger 70 prior to entering the first expansion device 44. Although the thermocouple 48 is depicted in FIG. 4 adjacent the first expansion device 44, the thermocouple could be positioned near an outlet of the third heat exchanger 70, or anywhere between the two devices. Even more, an additional thermocouple could be utilized to sense the temperature in the heating mode in an alternate embodiment.

As described above, the thermocouple 48 is electrically connected to the control module 20 which receives the sensed temperature ($T_1$) of the refrigerant for use in calculating a desired power of the compressor 12. As described above in the cooling mode, the desired power is calculated using the sensed temperature ($T_1$), a second sensed temperature ($T_2$), a sensed pressure ($P_1$), and at least one ambient condition of the vehicle. Depending upon the calculated desired power in the heating mode, a parameter of the compressor 12 is adjusted.

In the first expansion device 44, the outlet refrigerant from the third heat exchanger 70 is expanded to become an intermediate-pressure, intermediate-temperature liquid and vapor refrigerant mixture which is supplied to a separator 50 as shown by action arrow 52. Again, regulation of the flow of refrigerant through the expansion device 44, or throttling, is used to control a temperature of the refrigerant within the separator 50 to ensure optimal performance. Increasing the pressure drop necessarily lowers the temperature of the refrigerant within the separator 50. The control module 20 operates to control the flow of the refrigerant and a drop in pressure of the refrigerant moving through the expansion device. The drop in pressure is changed dependent upon the same inputs used to calculate the desired power of the compressor by the control module 20.

The resulting intermediate-pressure, intermediate-temperature liquid and vapor refrigerant mixture is separated in the separator 50. As in the cooling mode, an intermediate-pressure, intermediate-temperature gas refrigerant exits the separator 50, as shown by action arrow 56, and is received in the inlet port 24 of the second scroll 18 of the compressor 12 where the gas refrigerant is again compressed and cycled through the system 10. The separated liquid refrigerant within the separator 50 is sent to the second expansion device 54.

In the second expansion device 54, the liquid refrigerant is expanded to become a low-pressure, low-temperature liquid and vapor refrigerant mixture which is supplied to the first heat exchanger 38, in the heating mode, as shown by action arrows 80. Regulation of the flow of refrigerant through the expansion device 54, or throttling, is used to control a temperature of the refrigerant fed to the first heat exchanger 38. Increasing the pressure drop necessarily lowers the temperature of the refrigerant within the first heat exchanger 38. The control module 20 operates to control the flow of the refrigerant and a drop in pressure of the refrigerant moving through the expansion device. The drop in pressure is changed dependent upon the same inputs used to calculate the desired power of the compressor by the control module 20.

Although not depicted in the drawing figures, one or more control modules within the vehicle operate to control the flow of the refrigerant moving within the system 10 dependent upon the mode of operation. As shown in FIG. 1, in the cooling mode, refrigerant generally flows through the three-way valve 34, to the first heat exchanger 38, the first expansion device 44, the second expansion device, the second heat exchanger 58, and back to the compressor 12. In the heating mode, however, the refrigerant generally flows through the three-way valve 34, to the third heat exchanger 70, the first expansion device 44, the second expansion device 54, the first heat exchanger 38, and back to the compressor 12. These refrigerant flows are controlled, in the described embodiment, using a plurality of solenoid valves.

In the described heating mode, the first heat exchanger 38 functions as an evaporator. Warm, moist air flowing across the evaporator 38 (as shown by arrow 82) transfers its heat to the cooler refrigerant within the evaporator. Within the evaporator 38, the low-pressure, low-temperature vapor and liquid refrigerant mixture boils to a vapor due to the heat removed from the air. A low-pressure, low-temperature vapor refrigerant exits the evaporator 38, as shown by action arrow 84, and is received at the first suction port 22 of the first scroll 16 of the compressor 12.

Again, a thermocouple 81 senses a temperature ($T_2$) of the refrigerant outlet from the first heat exchanger 38 prior to entering the compressor 12. Although the thermocouple 81 is depicted in FIG. 4 near the first heat exchanger 38, the thermocouple, or a different type of temperature sensor in an alternate embodiment, could be positioned anywhere between the two devices. The thermocouple 81 is electrically connected (as shown by dashed line) to the control module 20 which receives the sensed temperature ($T_2$) of the refrigerant for use in calculating the desired power of the compressor 12.

Similarly, a transducer 83 senses a pressure ($P_2$) of the refrigerant outlet from the first heat exchanger 38 prior to entering the compressor 12. Although the transducer 83 is depicted in FIG. 4 adjacent the thermocouple 81, the transducer, or a different type of pressure sensor in an alternate embodiment, could be positioned anywhere between the two devices. The transducer 83 is electrically connected (as shown by dashed line) to the control module 20 which receives the sensed pressure ($P_2$) of the refrigerant for use in calculating the desired power of the compressor 12.

In the compressor 12, the refrigerant is again compressed and cycled through the system 10. More specifically, compression of low-pressure, low-temperature vapor occurs within the first scroll 16 and compression of intermediate-pressure, intermediate-temperature vapor from the separator 50 occurs within the second scroll 18 at the same time. As indicated above, the compressed refrigerants from the first and second scrolls of the compressor 12 are merged prior to being directed by the three-way valve 34.

As indicated above, the control module 20 in the described embodiment adjusts a speed of the motor dependent upon certain factors. These factors include at least one ambient condition of the vehicle and the sensed temperatures ($T_1$ and $T_2$) and the sensed pressure ($P_1$). As described above, the sensed temperatures $T_1$ and $T_2$ and the sensed pressure $P_1$ are determined at different locations within the system depending upon the mode of operation. The at least one ambient condition may include one or more of an ambient temperature, an ambient humidity, and a solar load of the vehicle. Depending upon the calculated desired power, a parameter of the compressor 12 may be adjusted and/or a pressure of the refrigerant may be changed within the first and/or second expansion devices. While the control module is effective across all ambient temperatures and attempts to improve system efficiency across the entire operating range, the degree of improvement varies at different temperatures.

In the cooling mode, for example, algorithms within the control module react to the ambient air temperature ($T_A$). Referring generally to the pressure-enthalpy (p-h) diagram in FIG. 3, at a certain ambient temperature, there is a corresponding evaporating temperature T1 and evaporating pressure P1 (note that T/P are constant on line F-A). The warmer the ambient temperature, the higher the evaporating pressure. Given T1, P1 and T3, there is an optimal discharge pressure (Pd=$P_B$=$P_C$=$P_H$=$P_I$) and intermediate pressure (Pm=$P_D$=$P_E$=$P_G$) that yields a maximum coefficient of performance (COP). The compressor power required to achieve such optimal operating conditions is then calculated, i.e., a heat of compression, compressor work, or compressor power, is calculated.

Figure 5:
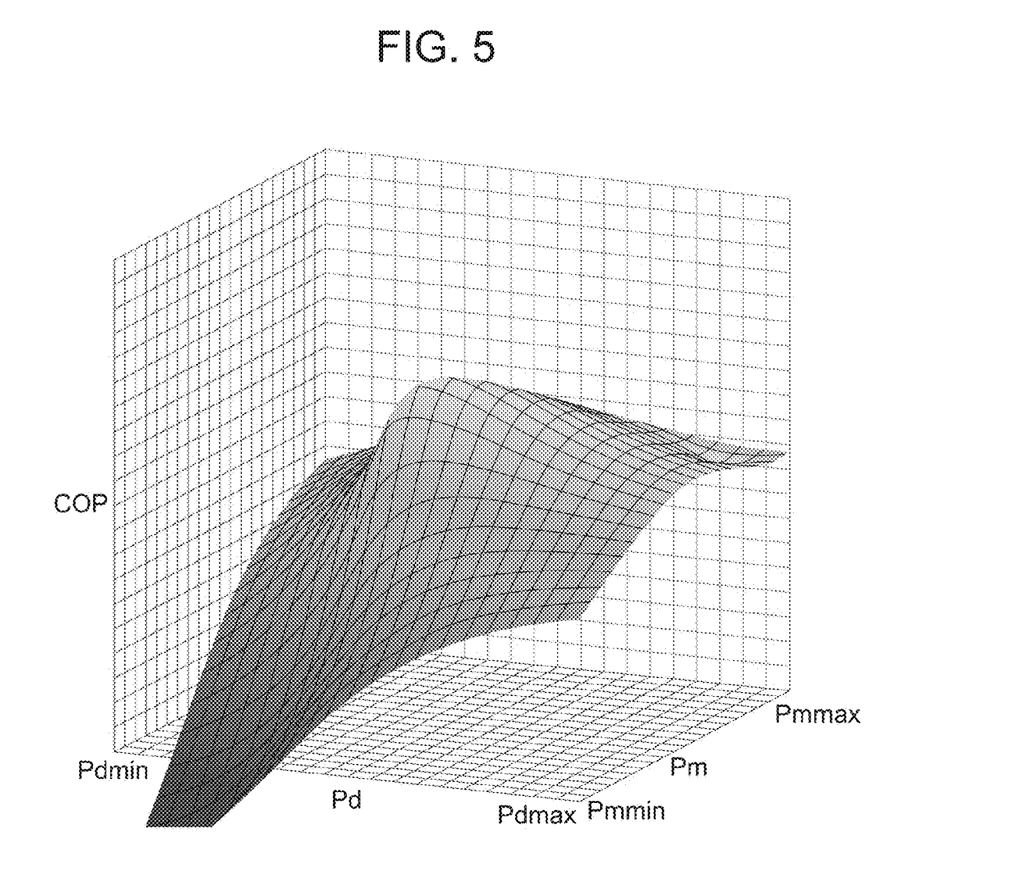
FIG. 5 is a representative coefficient of performance (COP) contour graph for the vehicle heating and cooling system.

With reference to FIG. 1, the refrigeration capacity and compressor work are calculated as $Q_e$=(1−$x_D$)($h_A$−$h_F$) and $W_c$=$x_D$($h_H$−$h_G$)+(1−$x_D$)($h_B$−$h_A$), where $x_D$=($h_D$−$h_E$)/($h_G$−$h_E$). Given the evaporator refrigerant outlet pressure, and heat exchanger (e.g., evaporator and gas cooler) refrigerant outlet temperatures, there is an optimal intermediate pressure and discharge pressure for the maximum COP (=$Q_e$/$W_c$). FIG. 5 shows a COP contour at an evaporating temperature of 5 degrees Celsius (assuming saturated vapor at the evaporator outlet) and gas cooler exit temperature of 40 degrees Celsius. The optimal intermediate and discharge pressures are found to be 54.4 bar and 98.7 bar, respectively, yielding a maximum COP of 2.76. Utilizing parallel compression as described with regard to the embodiment in FIG. 1 improves the system efficiency by 15% over a cycle with single compression.

The correlation of optimal discharge (Pd) and intermediate pressure (Pm) as a function of $T_1$, $P_1$, and $T_2$ is built in the control module as part of the algorithms. The control module then adjusts the displacement (for mechanical compressors) or motor speed (for electric compressors) to produce the required power (Wc). The control module also controls the opening size of the first expansion device, in the described embodiment, to give the pressure drop of Pd–Pm, or $P_C$-$P_D$, and the second expansion device to give Pm–Pe, or $P_D$-$P_A$.

In accordance with the method of heating and cooling a passenger compartment in a vehicle having a heating and cooling system, a fluid is compressed in a first and a second compression cycle of a compressor 12. In one embodiment, the first and second compression cycles occur in first and second scrolls 16, 18 of the compressor operating in parallel. In other embodiments, the first and second scrolls may operate in series.

In other steps, an ambient temperature of the vehicle is determined and a temperature of the fluid is sensed. In the described embodiment, the temperature of the fluid outlet from a first heat exchanger is sensed. In another step, a second temperature and a pressure of the fluid is sensed. In the described embodiment, the second temperature and the pressure of the fluid outlet from a second exchanger is sensed. In another step, a desired power of the compressor 12 is calculated based on the ambient temperature and sensed temperatures and pressure of the fluid. The algorithms utilized to calculate the desired power within the control module are broadly described above and may rely on additional ambient conditions of the vehicle (e.g., solar load). Dependent upon the calculated desired power of the compressor, a parameter of the compressor is adjusted. In the described embodiment, a speed of the motor driving the compressor may be adjusted.

In another embodiment, the method may include the step of changing a pressure of the fluid dependent upon the calculated desired pressure drop $P_C$-$P_D$ and/or $P_D$-$P_A$. This step may be accomplished by adjusting a size of the orifice of at least one of the expansion devices through which the fluid moves. In another embodiment, the first heat exchanger cools the compressed high-temperature refrigerant vapor and the second heat exchanger functions as an evaporator in the cooling mode, and the first heat exchanger functions as an evaporator and the second heat exchanger cools the high-temperature vapor refrigerant in the heating mode. For example, in the cooling mode shown in FIG. 1, the first heat exchanger 38 cools the compressed high-temperature vapor refrigerant and the second heat exchanger 58 functions as an evaporator. Similarly, in the heating mode shown in FIG. 4, the first heat exchanger 38 functions as an evaporator and a second heat exchanger (which is referred to as a third heat exchanger 70) cools the high-temperature vapor refrigerant.

Figure 6:
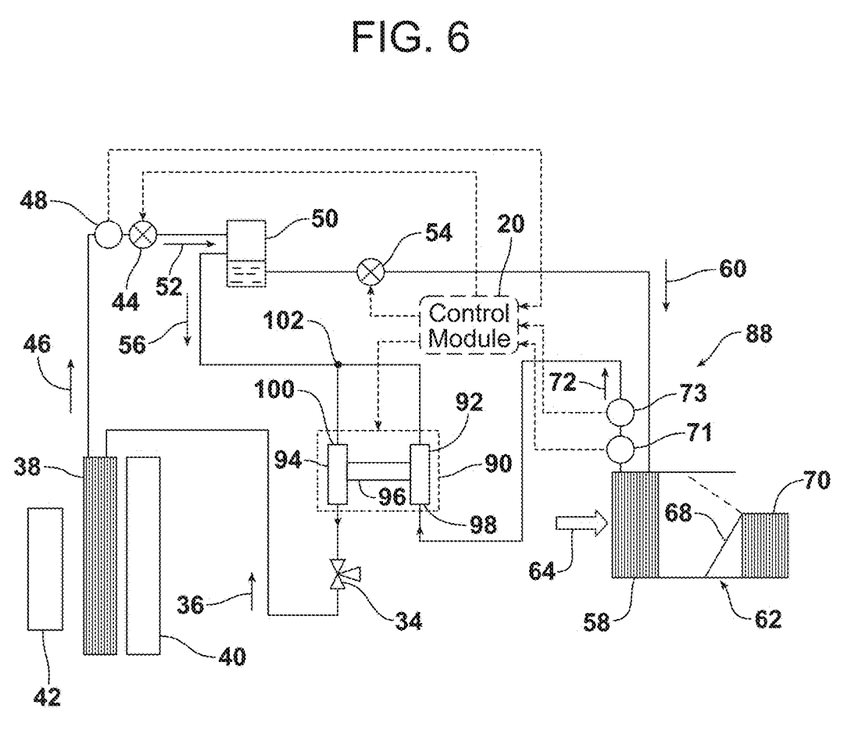
FIG. 6 is a schematic diagram of an alternate embodiment of a vehicle heating and cooling system having a compressor with dual scrolls operating in a multistage compression configuration in a cooling mode.

Reference is now made to FIG. 6 which illustrates a schematic diagram of a vehicle heating and cooling system 88 including a compressor 90. The heating and cooling system 88 is generally the same as the system described with regard to FIG. 1 except first and second scrolls 92, 94 of the compressor 90 use multi-stage compression. In other words, the first scroll 92 and the second scroll 94 of the compressor 90 operate in series to compress the fluid in a cycle including first and second compressions. More specifically, the compressor 90 includes a single type shaft 96 shared by the first and second scrolls 92, 94 driven by a variable speed motor (not shown). The control module 20 adjusts a speed of the motor dependent upon certain factors as described above.

In the described embodiment, a high-pressure, high-temperature vapor refrigerant exits the compressor 90 and is fed to a three-way valve 34. A control module signals the three-way valve 34, in the described embodiment, to direct the high-pressure, high-temperature vapor refrigerant as shown by action arrow 36 to a first heat exchanger 38. The first heat exchanger is an outdoor heat exchanger in the cooling mode.

In the cooling mode, the first heat exchanger 38 is positioned in front of an engine radiator 40 as is known in the art and functions as a gas cooler to cool the high-pressure, high-temperature vapor refrigerant discharged from the compressor 90. Within the first heat exchanger 38, the refrigerant is cooled due primarily to the effect of outside air. A fan 42 may be utilized to create and regulate a flow of air over the first heat exchanger 38 and the radiator 40.

The cooled, high-pressure refrigerant is then sent to a first expansion device 44 as shown by action arrow 46. A thermocouple 48 senses a temperature ($T_1$) of the refrigerant outlet from the first heat exchanger 38 prior to entering the first expansion device 44. The thermocouple 48 is electrically connected to the control module 20 which receives the sensed temperature ($T_1$) of the refrigerant for use in calculating a desired power of the compressor 90. The desired power is calculated using the sensed temperature ($T_1$), a second sensed temperature ($T_2$), a sensed pressure ($P_1$), and at least one ambient condition (e.g., an ambient temperature ($T_A$)) of the vehicle as described above. Depending upon the calculated desired power, a parameter of the compressor 90 is adjusted. For example, the speed of the motor of the compressor 90 may be adjusted.

In the first expansion device 44, the outlet refrigerant from the first heat exchanger 38 is expanded to become an intermediate-temperature, intermediate-pressure liquid and vapor refrigerant mixture which is supplied to a separator 50 as shown by action arrow 52. Regulation of the flow of refrigerant through the expansion device 44, or throttling, is used to control a temperature of the refrigerant within the separator 50. Increasing the pressure drop necessarily lowers the temperature of the refrigerant within the separator 50.

The control module 20 is electrically connected to the expansion device 44 (as shown by dashed line) and operates to control the flow of the refrigerant and a drop in pressure of the refrigerant moving through the expansion device to ensure optimal performance. In the described embodiment, the first expansion device 44 is an electronic expansion device having an opening therein through which the refrigerant passes. The control module 20 controls a size of the opening within the expansion device 44 which determines the drop in pressure of the refrigerant moving through the device. The drop in pressure is changed dependent upon the same inputs used to calculate the desired power of the compressor by the control module 20.

An intermediate-temperature, intermediate-pressure gas refrigerant exits the separator 50, as shown by action arrow 56, and is merged with a vapor exiting the first scroll 92 of the compressor 90 at merger point 102. The separated liquid refrigerant within the separator 50 is sent as an intermediate-pressure, intermediate-temperature liquid refrigerant to the second expansion device 54. In the second expansion device 54, the intermediate-pressure, liquid refrigerant is expanded to become a low-pressure, low-temperature liquid and vapor refrigerant mixture which is supplied to a second heat exchanger 58 as shown by action arrow 60. Regulation of the flow of refrigerant through the expansion device 54, or throttling, is used to control a temperature of the refrigerant within the second heat exchanger 58. Increasing the pressure drop necessarily lowers the temperature of the refrigerant within the second heat exchanger 58.

Again, the control module 20 is electrically connected to the second expansion device 54 (as shown by dashed line) and operates to control the flow of the refrigerant and a drop in pressure of the refrigerant moving through the expansion device to ensure optimal performance. In the described embodiment, the second expansion device 54 is an electronic expansion device having an opening therein through which the refrigerant passes. The control module 20 controls a size of the opening within the expansion device 54 which determines the drop in pressure of the refrigerant moving through the device. The drop in pressure is changed dependent upon the same inputs used to calculate the desired power of the compressor by the control module 20.

In the described cooling mode, the second heat exchanger 58 functions as an evaporator. As is known in the art, the evaporator 58 is positioned within a heating, ventilation, and air conditioning (HVAC) case 62 of the vehicle and is used to cool a passenger compartment (not shown). Warm, moist air flowing across the evaporator 58 (as shown by arrow 64) transfers its heat to the cooler refrigerant within the evaporator. The byproducts are a lowered temperature air and condensation from the air which is routed from the evaporator 58 to an exterior of the vehicle. A blower (not shown) blows air across the evaporator 58 and through a vent 66 to the passenger compartment. This process results in the passenger compartment having a cooler, drier air therein. A blend door 68 blocks the flow of air from entering a third heat exchanger 70 which is utilized in the heating mode and will be described below.

Within the evaporator 58, the low-pressure, low-temperature vapor and liquid refrigerant mixture boils to a vapor due to the heat removed from the air. The low-pressure, low-temperature vapor refrigerant exits the evaporator 58, as shown by action arrow 72, and is received at a first suction port 98 of the first scroll 92 of the compressor 90. A thermocouple 71 senses a temperature ($T_2$) of the refrigerant outlet from the second heat exchanger 58 prior to entering the compressor 90. Although the thermocouple 71 is depicted in FIG. 6 adjacent the second expansion device 58, the thermocouple, or a different type of temperature sensor in an alternate embodiment, could be positioned near an outlet of the second heat exchanger 58, or anywhere between the two devices. The thermocouple 71 is electrically connected (as shown by dashed line) to the control module 20 which receives the sensed temperature ($T_2$) of the refrigerant for use in calculating the desired power of the compressor 90.

Similarly, a transducer 73 senses a pressure ($P_2$) of the refrigerant outlet from the second heat exchanger 58 prior to entering the compressor 90. Although the transducer 73 is depicted in FIG. 6 adjacent the thermocouple 71, the transducer, or a different type of pressure sensor in an alternate embodiment, could be positioned near an outlet of the second heat exchanger 58, or anywhere between the two devices. The transducer 73 is electrically connected (as shown by dashed line) to the control module 20 which receives the sensed pressure ($P_2$) of the refrigerant for use in calculating the desired power of the compressor 90.

In the first scroll 92 of the compressor 90, the refrigerant is compressed and merges with the vapor from the separator 50 at merger point 102. As indicated above, the merged refrigerant vapors are received at a first suction port 100 of the second scroll 94 where the gas refrigerant is again compressed in the second scroll and cycled through the system 88.

Figure 7:
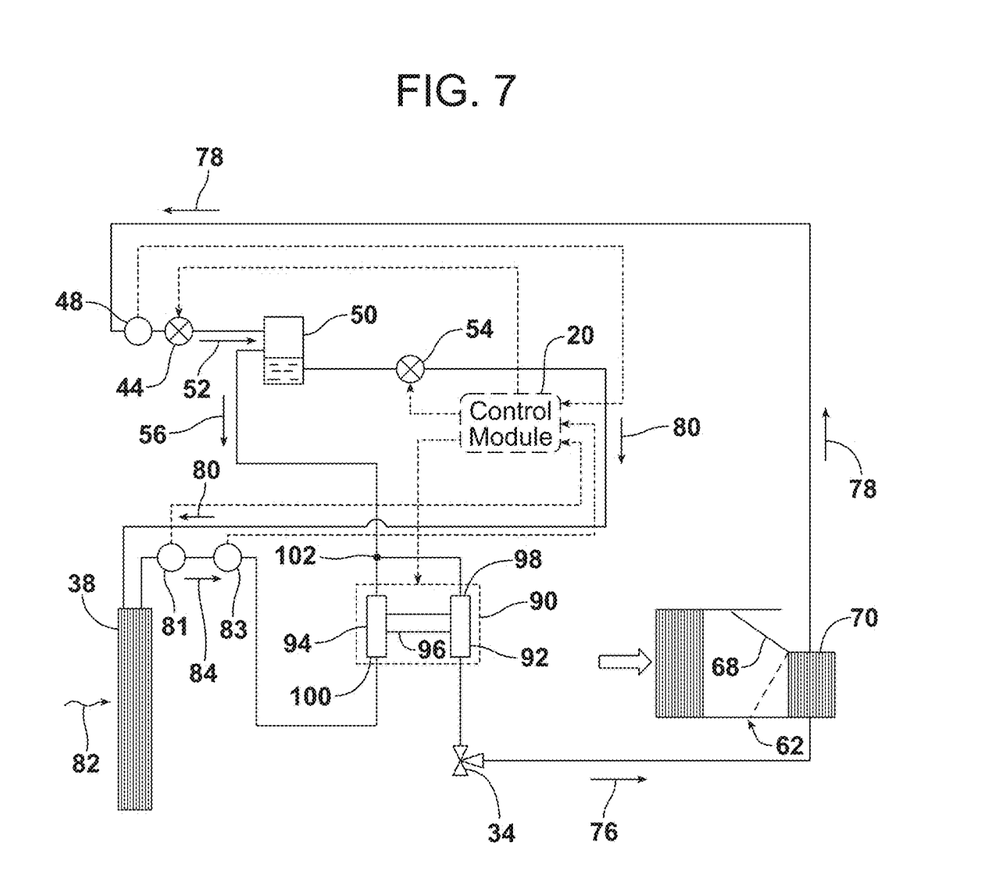
FIG. 7 is a schematic diagram of the alternate embodiment of the vehicle heating and cooling system having a compressor with dual scrolls operating in a multistage compression configuration in a heating mode.

In the heating mode of the alternate embodiment shown in FIG. 7, the three-way valve 34 directs the merged high-pressure, high-temperature vapor refrigerant to the third heat exchanger 70 as shown by action arrow 76. The third heat exchanger 70 is a supplemental heat exchanger positioned within the HVAC case 62 of the vehicle. The blend door 68 is used in the heating mode to regulate the flow of air created by the blower (not shown) allowing air to travel through, or partially through, the supplemental heat exchanger 70. In this manner, a temperature of the air used to warm the passenger compartment can be adjusted. As cool air passes through the supplemental heat exchanger 70, the high-pressure, high-temperature vapor refrigerant is cooled due primarily to the effect of outside air.

The cooled, high-pressure refrigerant is then sent to the first expansion device 44 as shown by action arrows 78. The thermocouple 48 senses a temperature ($T_1$) of the refrigerant outlet from the third heat exchanger 70 prior to entering the first expansion device 44. Although the thermocouple 48 is depicted in FIG. 7 adjacent the first expansion device 44, the thermocouple could be positioned near an outlet of the third heat exchanger 70, or anywhere between the two devices.

As described above, the thermocouple 48 is electrically connected to the control module 20 which receives the sensed temperature ($T_1$) of the refrigerant for use in calculating a desired power of the compressor 90. As described above in the cooling mode, the desired power is calculated using the sensed temperature ($T_1$), a second sensed temperature ($T_2$), a sensed pressure ($P_1$), and at least one ambient condition (e.g., an ambient temperature ($T_A$)) of the vehicle. Depending upon the calculated desired power in the heating mode, a parameter of the compressor 90 is adjusted.

In the first expansion device 44, the outlet refrigerant from the third heat exchanger 38 is expanded to become an intermediate-pressure, intermediate-temperature liquid and vapor refrigerant mixture which is supplied to a separator 50 as shown by action arrow 52. Again, regulation of the flow of refrigerant through the expansion device 44, or throttling, is used to control a temperature of the refrigerant within the separator 50. Increasing a pressure drop necessarily lowers the temperature of the refrigerant within the separator 50. The control module 20 operates to control the flow of the refrigerant and necessarily the drop in pressure of the refrigerant moving through the expansion device to ensure optimal performance. The drop in pressure is changed dependent upon the same inputs used to calculate the desired power of the compressor by the control module 20.

The intermediate-pressure, intermediate-temperature liquid and vapor refrigerant mixture is separated in the separator 50. As in the cooling mode, an intermediate-pressure, intermediate-temperature gas refrigerant exits the separator 50, as shown by action arrow 56, and is merged with a vapor exiting the second scroll 94 of the compressor 90 at merger point 102. The separated liquid refrigerant within the separator 50 is sent to the second expansion device 54.

In the second expansion device 54, the liquid refrigerant is expanded to become a low-pressure, low-temperature liquid and vapor refrigerant mixture which is supplied to the first heat exchanger 38 as shown by action arrows 80. Regulation of the flow of refrigerant through the expansion device 54, or throttling, is used to control a temperature of the refrigerant fed to the first heat exchanger 38. Increasing a pressure drop necessarily lowers the temperature of the refrigerant within the first heat exchanger 38. The control module 20 operates to control the flow of the refrigerant and necessarily the drop in pressure of the refrigerant moving through the expansion device to ensure optimal performance. The drop in pressure is changed dependent upon the same inputs used to calculate the desired power of the compressor by the control module 20.

In the described heating mode, the first heat exchanger 38 functions as an evaporator. Warm, moist air flowing across the evaporator 38 (as shown by arrow 82) transfers its heat to the cooler refrigerant within the evaporator. Within the evaporator 38, the low-pressure, low-temperature vapor and liquid refrigerant mixture boils to a vapor due to the heat removed from the air. A low-pressure, low-temperature vapor refrigerant exits the evaporator 38, as shown by action arrow 84, and is received at the first suction port 100 of the second scroll 94 of the compressor 90.

A thermocouple 81 senses a temperature ($T_2$) of the refrigerant outlet from the first heat exchanger 38 prior to entering the compressor 90. Although the thermocouple 81 is depicted in FIG. 7 near the first heat exchanger 38, the thermocouple, or a different type of temperature sensor in an alternate embodiment, could be positioned anywhere between the two devices. The thermocouple 81 is electrically connected (as shown by dashed line) to the control module 20 which receives the sensed temperature ($T_2$) of the refrigerant for use in calculating the desired power of the compressor 90.

Similarly, a transducer 83 senses a pressure ($P_2$) of the refrigerant outlet from the first heat exchanger 38 prior to entering the compressor 90. Although the transducer 83 is depicted in FIG. 7 adjacent the thermocouple 81, the transducer, or a different type of pressure sensor in an alternate embodiment, could be positioned anywhere between the two devices. The transducer 83 is electrically connected (as shown by dashed line) to the control module 20 which receives the sensed pressure ($P_2$) of the refrigerant for use in calculating the desired power of the compressor 90.

In the second scroll 94, the refrigerant is compressed and merges with the vapor from the separator 50 at merger point 102. As indicated above, the merged refrigerant vapors are received at a first suction port 98 of the first scroll 92 where the gas refrigerant is again compressed in the first scroll prior to being directed by the three-way valve 34 and cycled through the system 88.

In summary, numerous benefits result from the vehicle heating and cooling system 10 and related method of heating and cooling a passenger compartment of a vehicle as illustrated in this document. The system is capable of adjusting a compressor dependent upon an ambient temperature of the vehicle and other parameters to achieve optimal conditions and maximize system efficiency.

The foregoing has been presented for purposes of illustration and description. It is not intended to be exhaustive or to limit the embodiments to the precise form disclosed. Obvious modifications and variations are possible in light of the above teachings. For example, the devices controlled by control module 20 in the described embodiment could be controlled by a plurality of control modules within the vehicle. The plurality of control modules could each control one or more devices within the system and communicate with one another via a controller area network (CAN) bus. All such modifications and variations are within the scope of the appended claims when interpreted in accordance with the breadth to which they are fairly, legally and equitably entitled.

What is claimed:

1. A vehicle heating and cooling system, comprising:
   a compressor having a first scroll and a second scroll for compressing a fluid, said first scroll compressing a low pressure portion of the fluid received via a first port and said second scroll compressing an intermediate pressure portion of the fluid received via a second port; and
   a control module for controlling said compressor dependent upon an ambient condition of the vehicle wherein said ambient condition is selected from a group consisting of ambient temperature, ambient humidity, solar load and combinations thereof.

2. The vehicle heating and cooling system of claim 1, wherein said first and second scrolls operate in parallel compressing the low pressure portion of the fluid received via said first port and the intermediate pressure portion of the fluid received via said second port at substantially the same time.

3. The vehicle heating and cooling system of claim 2, wherein the low pressure portion of the fluid compressed in said first scroll is merged with the intermediate pressure portion of the fluid compressed in said second scroll and reintroduced to the vehicle heating and cooling system via a valve dependent upon a mode of operation of the vehicle heating and cooling system.

4. The vehicle heating and cooling system of claim 1, wherein said at least one compressor is an electric compressor driven by a motor and said control module controls the power of said electric compressor by adjusting a speed of said motor.

5. The vehicle heating and cooling system of claim 1, wherein said at least one compressor is a belt-driven variable displacement compressor and said control module controls the power of said belt-driven variable displacement compressor by adjusting a displacement of said belt-driven variable displacement compressor.

6. The vehicle heating and cooling system of claim 1, wherein said first and second scrolls operate in series compressing the low pressure portion of the fluid received via said first port in said first scroll, combining the compressed low pressure portion of the fluid from said first scroll with the intermediate pressure portion of the fluid received via said second port, and compressing the combined compressed low pressure portion of the fluid and intermediate pressure portion of the fluid in said second scroll.

7. The vehicle heating and cooling system of claim 1, wherein said compressor includes a single type shaft shared by said first and second scrolls.

8. The vehicle heating and cooling system of claim 1, further comprising first and second expansion devices, wherein said control module controls a first pressure drop of the fluid moving through said first expansion device and a second pressure drop of fluid moving through said second expansion device dependent upon at least the ambient condition of the vehicle.

9. The vehicle heating and cooling system of claim 8, further comprising a first temperature sensor for sensing a temperature of the fluid outlet from a first heat exchanger, and a second temperature sensor for sensing a temperature and a first pressure transducer for sensing a pressure of the fluid outlet from a second heat exchanger, wherein said control module controls said at least one compressor dependent upon the ambient condition of the vehicle, the first sensed temperature, the second sensed temperature, and the first sensed pressure.

10. A vehicle heating and cooling system, comprising:
    a first expansion device through which a fluid moves creating a first pressure drop;

a second expansion device through which the fluid moves creating a second pressure drop;

a compressor having a first scroll and a second scroll for compressing the fluid, said first scroll compressing a low pressure portion of the fluid received via a first port from said second expansion device and said second scroll compressing an intermediate pressure portion of the fluid received via a second port from said first expansion device; and a control module for controlling said compressor and at least one of said first and said second expansion devices dependent upon an ambient condition of the vehicle wherein said ambient condition is selected from a group consisting of ambient temperature, ambient humidity, solar load and combinations thereof.

11. The vehicle heating and cooling system of claim 10, wherein said control module further controls said compressor and said at least one of said first and said second expansion devices dependent upon at least one of a first temperature of the fluid between a first heat exchanger and said first expansion device, a second temperature of the fluid between a second heat exchanger and said compressor, and a pressure of the fluid between said second heat exchanger and said compressor.

12. The vehicle heating and cooling system of claim 10, further comprising a first temperature sensor for sensing a temperature of the fluid outlet from a first heat exchanger, and a second temperature sensor for sensing a temperature and a first pressure transducer for sensing a pressure of the fluid outlet from a second heat exchanger, wherein said control module controls said at least one compressor dependent upon the ambient condition of the vehicle, the first sensed temperature, the second sensed temperature, and the first sensed pressure.

13. The vehicle heating and cooling system of claim 10, wherein the low pressure portion of the fluid compressed in said first scroll is merged with the intermediate pressure portion of the fluid compressed in said second scroll and reintroduced to the vehicle heating and cooling system via a valve dependent upon a mode of operation of the vehicle heating and cooling system.

14. The vehicle heating and cooling system of claim 10, wherein said first and second scrolls operate in series compressing the low pressure portion of the fluid received via said first port in said first scroll, combining the compressed low pressure portion of the fluid from said first scroll with the intermediate pressure portion of the fluid received via said second port, and compressing the combined compressed low pressure portion of the fluid and intermediate pressure portion of the fluid in said second scroll.

15. A method of heating and cooling a passenger compartment in a vehicle having a heating and cooling system, comprising the steps of:

compressing a first portion of a fluid received via a first port of a compressor in a first scroll and a second portion of the fluid received via a second port of said compressor in a second scroll;

reintroducing a merged fluid, including the compressed first portion of the fluid received via said first port and the compressed second portion of the fluid received via said second port, to the vehicle heating and cooling system via a valve;

determining an ambient temperature and at least one of an ambient humidity and a solar load of the vehicle;

sensing a temperature of the fluid outlet from a first heat exchanger;

sensing a temperature and a pressure of the fluid outlet from a second heat exchanger;

calculating a desired power of said compressor based on (a) the ambient temperature, (b) at least one of the ambient humidity and the solar load and (c) the sensed temperature outlet from said first heat exchanger and the sensed temperature and pressure of the fluid outlet from said second heat exchanger; and adjusting a parameter of said compressor dependent upon the calculated desired power of said compressor.

16. The method of heating and cooling a passenger compartment in a vehicle having a heating and cooling system of claim 15, wherein the step of adjusting a parameter of said compressor includes adjusting a speed of a motor driving said compressor.

17. The method of heating and cooling a passenger compartment in a vehicle having a heating and cooling system of claim 16, further comprising the steps of calculating a desired pressure drop based on the ambient temperature and the sensed temperature outlet from said first heat exchanger and the sensed temperature and pressure of the fluid outlet from said second heat exchanger; and changing a pressure of the fluid dependent upon the calculated desired pressure drop.

18. The method of heating and cooling a passenger compartment in a vehicle having a heating and cooling system of claim 17, wherein the step of changing a pressure of the fluid includes adjusting a size of an orifice of at least one expansion device through which the fluid moves.

19. The method of heating and cooling a passenger compartment in a vehicle having a heating and cooling system of claim 15, wherein said first heat exchanger cools the compressed fluid and said second heat exchanger functions as an evaporator in a cooling mode and said first heat exchanger functions as an evaporator and said second heat exchanger cools the compressed fluid in a heating mode.

* * * * *